US009218568B2

United States Patent
Burbank et al.

(10) Patent No.: US 9,218,568 B2
(45) Date of Patent: Dec. 22, 2015

(54) DISAMBIGUATING DATA USING CONTEXTUAL AND HISTORICAL INFORMATION

(71) Applicants: JohnPaul Burbank, Vancouver (CA); Jennifer Sam, Burnaby (CA); Michael Tsumura, Vancouver (CA); George Sun, Coquitlam (CA); Yuru Wang, Coquitlam (CA)

(72) Inventors: JohnPaul Burbank, Vancouver (CA); Jennifer Sam, Burnaby (CA); Michael Tsumura, Vancouver (CA); George Sun, Coquitlam (CA); Yuru Wang, Coquitlam (CA)

(73) Assignee: Business Objects Software Ltd., Dublin (IE)

( * ) Notice: Subject to any disclaimer, the term of this patent is extended or adjusted under 35 U.S.C. 154(b) by 351 days.

(21) Appl. No.: 13/843,513

(22) Filed: Mar. 15, 2013

(65) Prior Publication Data
US 2014/0279803 A1 Sep. 18, 2014

(51) Int. Cl.
*G06N 5/02* (2006.01)

(52) U.S. Cl.
CPC ........................................ *G06N 5/02* (2013.01)

(58) Field of Classification Search
CPC ........... G06N 5/02; G06N 5/04; G06N 5/025; G06N 99/005
USPC ...................................................... 706/46–47
See application file for complete search history.

(56) References Cited

U.S. PATENT DOCUMENTS

| | | | |
|---|---|---|---|
| 4,994,967 | A | 2/1991 | Asakawa |
| 5,694,592 | A | 12/1997 | Driscoll |
| 5,873,056 | A | 2/1999 | Liddy et al. |
| 5,963,940 | A | 10/1999 | Liddy et al. |
| 6,182,029 | B1 | 1/2001 | Friedman |
| 6,549,897 | B1 | 4/2003 | Katariya et al. |
| 6,741,959 | B1 | 5/2004 | Kaiser |
| 7,027,974 | B1 | 4/2006 | Busch et al. |
| 7,036,080 | B1 | 4/2006 | James et al. |
| 7,181,451 | B2 | 2/2007 | Dehlinger et al. |
| 7,283,846 | B2 | 10/2007 | Spriestersbach et al. |
| 7,324,936 | B2 | 1/2008 | Saldanha et al. |
| 7,558,731 | B1 | 7/2009 | Hodjat et al. |
| 7,676,489 | B2 | 3/2010 | Kaiser |
| 7,792,814 | B2 | 9/2010 | Cohen |
| 7,849,048 | B2 | 12/2010 | Langseth et al. |
| 7,992,078 | B2 | 8/2011 | Penner et al. |
| 8,036,877 | B2 | 10/2011 | Treadgold et al. |
| 8,185,509 | B2 | 5/2012 | Cras |
| 8,229,883 | B2 | 7/2012 | Brauer et al. |

(Continued)

OTHER PUBLICATIONS

Garla V. et al., "Knowledge-based biomedical word sense disambiguation: an evaluation and application to clinical document classification", J Am Med Inform Assoc, 2013; 20, pp. 882-886.*

(Continued)

*Primary Examiner* — Jeffrey A Gaffin
*Assistant Examiner* — Dave Misir
(74) *Attorney, Agent, or Firm* — Fish & Richardson P.C.

(57) ABSTRACT

Techniques for disambiguating data using contextual and historical information include determining that data is potentially associated with two or more classifications of a plurality of classifications; obtaining contextual information associated with the data; obtaining historical information associated with a user of the computing system; and determining that the data is more likely associated with one classification of the two or more classifications than other classifications of the two or more classifications based on the contextual information and the historical information.

18 Claims, 2 Drawing Sheets

(56) References Cited

U.S. PATENT DOCUMENTS

| | | | |
|---|---|---|---|
| 8,271,429 B2 | 9/2012 | Ghuneim et al. | |
| 8,468,033 B2 | 6/2013 | Gunn | |
| 8,560,480 B2 | 10/2013 | Du et al. | |
| 8,719,308 B2 | 5/2014 | Xiong et al. | |
| 2005/0108630 A1 | 5/2005 | Wasson et al. | |
| 2006/0053133 A1 | 3/2006 | Parkinson | |
| 2008/0084573 A1 | 4/2008 | Horowitz et al. | |
| 2008/0147588 A1* | 6/2008 | Leffingwell et al. | 706/48 |
| 2008/0208805 A1 | 8/2008 | Wang et al. | |
| 2009/0132953 A1* | 5/2009 | Reed et al. | 715/781 |
| 2009/0144609 A1* | 6/2009 | Liang et al. | 715/230 |
| 2011/0178802 A1* | 7/2011 | Vernau et al. | 704/251 |
| 2011/0288868 A1* | 11/2011 | Lloyd et al. | 704/251 |
| 2012/0117007 A1* | 5/2012 | Agrawal et al. | 706/12 |
| 2012/0136649 A1 | 5/2012 | Freising et al. | |
| 2012/0166373 A1* | 6/2012 | Sweeney et al. | 706/14 |
| 2013/0046723 A1* | 2/2013 | Sweeney et al. | 706/47 |
| 2013/0086101 A1 | 4/2013 | Heidasch | |
| 2013/0110843 A1* | 5/2013 | Ellingsworth | 707/741 |
| 2013/0117012 A1 | 5/2013 | Orlin et al. | |
| 2013/0166597 A1 | 6/2013 | Khan et al. | |
| 2013/0318119 A1 | 11/2013 | Dalal | |

OTHER PUBLICATIONS

Daud M. et al., "Learning Implicit User Interests Using Ontology and Search History for Personalization", WISE 2007 Workshops, LNCS 4832, pp. 325-336, 2007.*

Expensify—Android Apps on Google Play; http://play.google.com/store/apps/details?id=org.me.mobiexpensifyg&hl=en; [last visited on Jan. 10, 2013], 2 pages.

Shoeboxed Receipt Tracker and Receipt Reader for iPhone, iPod touch, and iPad on the iTunes App Store; 3 pages; http://itunes.apple.com/us/app/shoeboxed/id322143854?mt=8 [last visited Jan. 10, 2013].

Xpen$er—Mobile Expense, Time, and Mileage Tracker; 4 pages; http://xpenser.com/ [last visited Jan. 10, 2013].

Semi-structured Data: Happy 10th Birthday!—AI3:::Adaptive Information; 14 pages; http://www.mkbergman.com/153/semi-structured-data-happy-10th-birthday/ [last visited Jan. 22, 2013].

* cited by examiner

FIG. 3

DISAMBIGUATING DATA USING CONTEXTUAL AND HISTORICAL INFORMATION

TECHNICAL BACKGROUND

This disclosure relates to disambiguating and optionally classifying data and, more particularly, disambiguating or classifying data using contextual and historical information.

BACKGROUND

A structured data collection is an organized collection of data. Databases and spreadsheets are examples of structured data collections. Data in a structured data collection reside in fixed fields within a record or a file. Traditionally, a user manually entered data into a fixed field of a record or a file by selecting the field and typing text into the field using a keyboard. Manually entering data into a data record using a keyboard, however, may be inflexible, inconvenient, inefficient, and time consuming. Automated entry of data into structured data collections is useful. However, automated entry of data presents some challenges relating to classification and word-sense disambiguation. Word-sense disambiguation is a problem in natural language processing where the meaning or sense of a word is identified. Meaning, once established, has utility for classification and other fields, such as information retrieval, machine translation, sentiment analysis, and spell checking Sets of highly accurate rules with predefined patterns have been developed to classify data and to map the data to the fields within the record or the file. The data, however, may not conform with the formal structure of data models associated with structured data collections, and classifying the data using such rules can be difficult.

SUMMARY

This disclosure describes systems, methods, apparatus, and computer-readable media for disambiguating data including, for example, the features of determining that data is potentially associated with two or more classifications of a plurality of classifications; obtaining contextual information associated with the data; obtaining historical information associated with a user of the computing system; and determining that the data is more likely associated with one classification of the two or more classifications than other classifications of the two or more classifications based on the contextual information and the historical information.

In a first aspect combinable with any of the general embodiments, determining that data is potentially associated with two or more classifications of a plurality of classifications includes determining that the data is potentially associated with a first classification of the two or more classifications based on one or more rules associated with the first classification; and determining that the data is potentially associated with a second classification of the two or more classifications based on one or more rules associated with the second classification.

In a second aspect combinable with any of the general embodiments, obtaining contextual information associated with the data includes obtaining an image containing text, performing optical character recognition on the image to identify the text, and identifying one or more terms of the text as describing at least one of a location, a date, a time, a monetary value, a product, or a service associated with the data; and determining that the data is more likely associated with one classification than other classifications includes determining that the one or more terms of the text is associated with the one classification.

In a third aspect combinable with any of the general embodiments, obtaining contextual information associated with the data includes determining geographical coordinates of the computing device, and obtaining information identifying a location associated with the data based on the geographical coordinates; and determining that the data is more likely associated with one classification than other classifications includes determining that the location is associated with the one classification.

In a fourth aspect combinable with any of the general embodiments, obtaining historical information associated with a user of the computing system includes, for each classification of the two or more classifications, obtaining a set of one or more terms previously identified by the user as being associated with the classification; and determining that the data is more likely associated with one classification than other classifications includes determining that one or more terms of the data is included in a set of one or more terms previously identified by the user as being associated with the one classification.

In a fifth aspect combinable with any of the general embodiments, obtaining historical information associated with a user of the computing system includes obtaining information identifying at least one of people, places, or things that the user has interacted with in the past; and determining that the data is more likely associated with the one classification than other classifications includes determining that the information identifying at least one of people, places, or things that the user has interacted with in the past is associated with the one classification.

A sixth aspect combinable with any of the general embodiments includes obtaining weights associated with the contextual information and the historical information; and determining that the data is more likely associated with the one classification of the two or more classifications than the other classifications of the two or more classifications based on the weights associated with the contextual information and the historical information.

Particular implementations of the subject matter described in this disclosure can be implemented so as to realize none, one, or more of the following advantages. The computing system may increase the chances of correctly classifying data by resolving ambiguities using contextual and historical information. The correctly classified data may be used to improve and expand data classification rules. The computing system may increase the chances of correctly disambiguating data, for example, determining the word-sense of data. This word sense disambiguation can be used in further information processing.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more implementations are set forth in the accompanying drawings and the description below. Other features, objects, and advantages will be apparent from the description and drawings, and from the claims.

DETAILED DESCRIPTION

In a general implementation of the present disclosure, a computing system determines word-sense of data by disambiguating data using contextual and historical information. The data may include unstructured data or semi-structured data. Unstructured data typically have no identifiable structure. The contents of word processing documents, email messages, digital images, digital audio, and digital videos are some examples of unstructured data. Semi-structured data, in some aspects, are data where some structured is associated with unstructured data. Semi-structured data may contain tags or other markers to separate semantic elements and enforce hierarchies of fields within unstructured data.

Data can be given meaning using word-sense disambiguation. This meaning can be used for further information processing like data classification. Data can be classified by assigning the data to one or more classifications of a given number of classifications. Because unstructured data has no identifiable structure and semi-structured data may not conform to the formal structure of data models, using traditional rules to determine the word-sense of unstructured data or semi-structured data may result in ambiguities. For example, data that includes the text string "Boston Market" to be classified may result in an ambiguity for the term "Boston". Using traditional classification rules, the computing system may identify the term "Boston" as identifying a city name and the terms "Boston Market" as identifying a restaurant name. The computing system may increase the chances of correctly determining the word-sense of data by using information from sources and services external to the data itself to resolve ambiguities. Such information may include contextual and historical information. Contextual information may include information describing circumstances or facts related to the data or related to obtaining the data, such as location, date, and time. Historical information may include information relating to a user's word usage, preferences, or past interactions.

Figure 1:
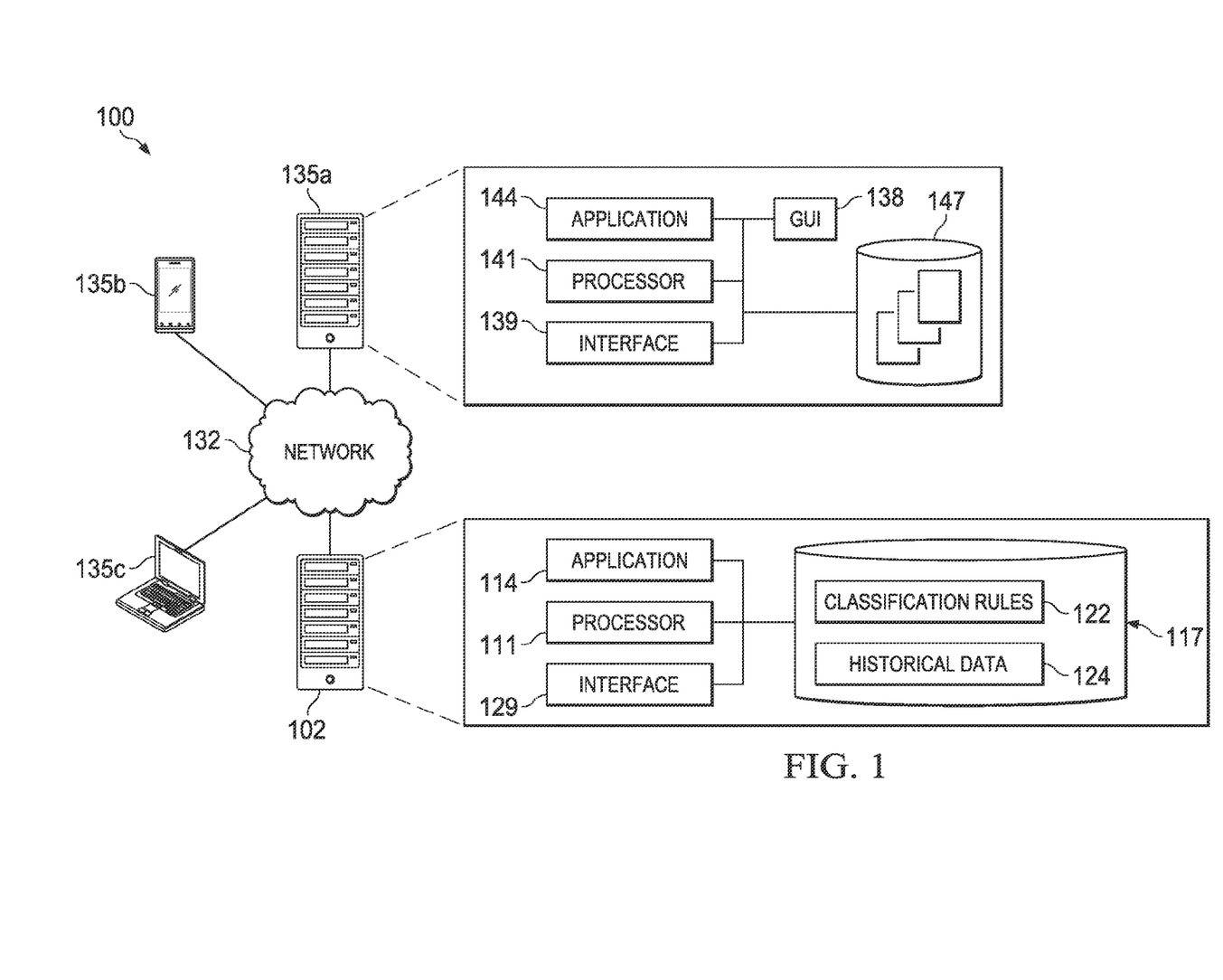
FIG. 1 shows an example of a distributed computing system environment operable to disambiguate data using contextual and historical information.

FIG. 1 shows an example of a distributed computing system environment 100 operable to disambiguate data using contextual and historical information. The environment 100 includes or is communicably coupled with a server 102 and one or more clients 135, at least some of which communicate across network 132. The server 102 stores one or more hosted applications 114, where at least a portion of the hosted applications 114 are executed via requests and responses sent to users or clients within and communicably coupled to the environment 100. An example of a hosted application 114 is a data disambiguation application. The data disambiguation application is executed by the server 102 to disambiguate data using contextual and historical information.

In some instances, the server 102 may store a plurality of various hosted applications 114, while in other instances, the server 102 may be a dedicated server meant to store and execute only a single hosted application 114. In some instances, the server 102 may include a web server, where the hosted applications 114 represent one or more web-based applications accessed and executed via network 132 by the clients 135 of the system to perform the programmed tasks or operations of the hosted application 114. At a high level, the server 102 includes an electronic computing device operable to receive, transmit, process, store, or manage data and information associated with the environment 100. Specifically, the server 102 illustrated in FIG. 1 is responsible for receiving application requests from one or more client applications 144 associated with the clients 135 of environment 100 and responding to the received requests by processing said requests in the associated hosted application 114, and sending the appropriate response from the hosted application 114 back to the requesting client application 144.

In addition to requests from the external clients 135 illustrated in FIG. 1, requests associated with the hosted applications 114 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, a virtual server, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system.

In the present implementation, and as shown in FIG. 1, the server 102 includes a processor 111, an interface 129, a memory 117, and one or more hosted applications 114. The interface 129 is used by the server 102 for communicating with other systems in a client-server or other distributed environment (including within environment 100) connected to the network 132 (e.g., client 135, as well as other systems communicably coupled to the network 132). Generally, the interface 129 includes logic encoded in software and/or hardware in a suitable combination and operable to communicate with the network 132. More specifically, the interface 129 may include software supporting one or more communication protocols associated with communications such that the network 132 or interface's hardware is operable to communicate physical signals within and outside of the illustrated environment 100.

Generally, the network 132 facilitates wireless or wireline communications between the components of the environment 100 (i.e., between the server 102 and the clients 135), as well as with any other local or remote computer, such as additional clients, servers, or other devices communicably coupled to network 132 but not illustrated in FIG. 1. The network 132 is illustrated as a single network in FIG. 1, but may be a continuous or discontinuous network without departing from the scope of this disclosure, so long as at least a portion of the network 132 may facilitate communications between senders and recipients. The network 132 may be all or a portion of an enterprise or secured network, while in another instance at least a portion of the network 132 may represent a connection to the Internet. In some instances, a portion of the network 132 may be a virtual private network (VPN), such as, for example, the connection between the client 135 and the server 102.

Further, all or a portion of the network 132 can include either a wireline or wireless link. Example wireless links may include 802.11a/b/g/n, 802.20, WiMax, and/or any other appropriate wireless link. In other words, the network 132 encompasses any internal or external network, networks, sub-network, or combination thereof operable to facilitate communications between various computing components inside and outside the illustrated environment 100. The network 132 may communicate, for example, Internet Protocol (IP) packets, Frame Relay frames, Asynchronous Transfer Mode (ATM) cells, voice, video, data, and other suitable information between network addresses. The network 132 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 111. Although illustrated as a single processor 111 in FIG. 1, two or more processors may be used according to particular needs, desires, or particular embodiments of environment 100. Each processor 111 may be a central processing unit (CPU), a blade, an application specific integrated circuit (ASIC), a field-programmable gate array (FPGA), or another suitable component. Generally, the processor 111 executes instructions and manipulates data to perform the operations of server 102 and, specifically, the one or more plurality of hosted applications 114. Specifically, the server's processor 111 executes the functionality required to receive and respond to requests from the clients 135 and their respective client applications 144, as well as the functionality required to perform the other operations of the hosted application 114.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, ABAP, Visual Basic, assembler, Perl, any suitable version of 4GL, as well as others. While portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 111 executes one or more hosted applications 114 on the server 102.

At a high level, each of the one or more hosted applications 114 is any application, program, module, process, or other software that may execute, change, delete, generate, or otherwise manage information according to the present disclosure, particularly in response to and in connection with one or more requests received from the illustrated clients 135 and their associated client applications 144. In certain cases, only one hosted application 114 may be located at a particular server 102. In others, a plurality of related and/or unrelated hosted applications 114 may be stored at a single server 102, or located across a plurality of other servers 102, as well. In certain cases, environment 100 may implement a composite hosted application 114. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. In some embodiments, portions of the composite application may be implemented through a single enterprise-class solution for data integration, data quality, data profiling, and text analysis.

Additionally, the hosted applications 114 may represent web-based applications accessed and executed by remote clients 135 or client applications 144 via the network 132 (e.g., through the Internet). Further, while illustrated as internal to server 102, one or more processes associated with a particular hosted application 114 may be stored, referenced, or executed remotely. For example, a portion of a particular hosted application 114 may be a web service associated with the application that is remotely called, while another portion of the hosted application 114 may be an interface object or agent bundled for processing at a remote client 135. Moreover, any or all of the hosted applications 114 may be a child or sub-module of another software module or enterprise application (not illustrated) without departing from the scope of this disclosure. Still further, portions of the hosted application 114 may be executed by a user working directly at server 102, as well as remotely at client 135.

The illustrated server 102 also includes memory 117. Memory 117 may include any memory or database module and may take the form of volatile or non-volatile memory including, without limitation, magnetic media, optical media, random access memory (RAM), read-only memory (ROM), removable media, or any other suitable local or remote memory component. Memory 117 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more hosted applications 114. For example, memory 117 may store classification rules 122 and historical data 124 that are used by the server 102 to classify and disambiguate data. The memory 117 may store rules for word-sense disambiguation in addition to or as an alternative to the classification rules 122. Additionally, memory 117 may include any other appropriate data, such as VPN applications, firmware logs and policies, firewall policies, a security or access log, print or other reporting files, as well as others.

The illustrated environment of FIG. 1 also includes one or more clients 135. Each client 135 may be any computing device operable to connect to or communicate with at least the server 102 and/or via the network 132 using a wireline or wireless connection. Further, as illustrated by client 135a, each client 135 includes a processor 141, an interface 139, a graphical user interface (GUI) 138, a client application 144, and a memory 147. In general, each client 135 includes an electronic computer device operable to receive, transmit, process, and store any appropriate data associated with the environment 100 of FIG. 1.

There may be any number of clients 135 associated with, or external to, environment 100. For example, while illustrated environment 100 includes three clients (135a, 135b, and 135c), alternative implementations of environment 100 may include a single client 135 communicably coupled to the server 102, or any other number suitable to the purposes of the environment 100. Additionally, there may also be one or more additional clients 135 external to the illustrated portion of environment 100 that are capable of interacting with the environment 100 via the network 132. Further, the term "client" and "user" may be used interchangeably as appropriate without departing from the scope of this disclosure.

Moreover, while each client 135 is described in terms of being used by a single user, this disclosure contemplates that many users may use one computer, or that one user may use multiple computers. As used in this disclosure, client 135 is intended to encompass a personal computer, touch screen terminal, workstation, network computer, kiosk, wireless data port, smart phone, personal data assistant (PDA), one or more processors within these or other devices, or any other suitable processing device. For example, each client 135 may include a computer that includes an input device, such as a keypad, touch screen, mouse, or other device that can accept user information, and an output device that conveys information associated with the operation of the server 102 (and hosted application 114) or the client 135 itself, including digital data, visual information, the client application 144, or the GUI 138. Both the input and output device may include fixed or removable storage media such as a magnetic storage media, CD-ROM, or other suitable media to both receive input from and provide output to users of the clients 135 through the display, namely, the GUI 138.

Further, the illustrated client 135 includes a GUI 138 including a graphical user interface operable to interface with at least a portion of environment 100 for any suitable purpose, including generating a visual representation of the client application 144 (in some instances, the client's web browser) and the interactions with the hosted application 114, including the responses received from the hosted application 114 received in response to the requests sent by the client application 144. Generally, through the GUI 138, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the GUI 138 can represent any graphical user interface, including but not limited to, a web browser, touch screen, or command line interface (CLI) that processes information in environment 100 and efficiently presents the information results to the user.

In general, the GUI 138 may include a plurality of user interface (UI) elements, some or all associated with the client application 144, such as interactive fields, pull-down lists, and buttons operable by the user at client 135. These and other UI elements may be related to or represent the functions of the client application 144, as well as other software applications executing at the client 135. In particular, the GUI 138 may be used to present the client-based perspective of the hosted application 114, and may be used (as a web browser or using the client application 144 as a web browser) to view and navigate the hosted application 114, as well as various web pages located both internal and external to the server, some of which may be associated with the hosted application 114. For purposes of the present location, the GUI 138 may be a part of or the entirety of the client application 144, while also merely a tool for displaying the visual representation of the client and hosted applications' 114 actions and interactions. In some instances, the GUI 138 and the client application 144 may be used interchangeably, particularly when the client application 144 represents a web browser associated with the hosted application 114.

While FIG. 1 is described as containing or being associated with a plurality of elements, not all elements illustrated within environment 100 of FIG. 1 may be utilized in each alternative implementation of the present disclosure. Additionally, one or more of the elements described herein may be located external to environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
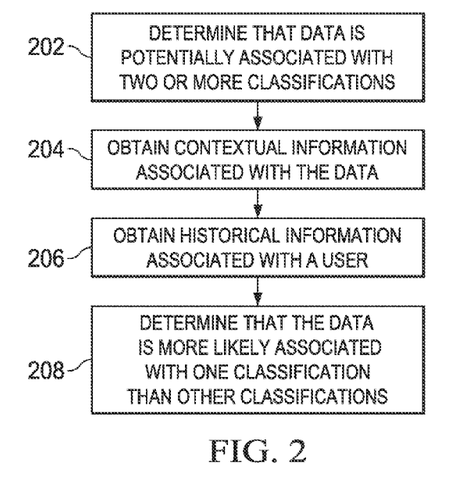
FIG. 2 shows a flowchart of examples of operations for disambiguating data using contextual and historical information.

FIG. 2 shows a flowchart of examples of operations 200 performed by a computing system of one or more computers, e.g., the server 102 of FIG. 1, to disambiguate data using contextual and historical information. The data may include text, an image, audio, or video. For purposes of illustration and without loss of generality, the process 200 will be described with respect to a computing system that disambiguates and classifies text data that includes, for example, a name of a place such as a city, a state, or a restaurant. For the same purpose of illustration and without loss of generality the aim of the process of FIG. 2 will be classification.

In FIG. 2, the computing system determines that data is potentially associated with two or more classifications of a given number of classifications at 202. To make this determination, the computing system may perform text analysis and parts-of-speech tagging on the text of the data. The computing system may determine that the data is associated with a classification based on, for example, classification rules and name catalogs associated with the classification.

Classification rules may be used to classify data. The rules may specify predefined patterns or characteristics of a text string that may be identified as being associated with a classification. For example, a rule for a city classification may specify that a text string that includes one or more words each beginning with a capital letter, e.g., proper nouns, may be identified as being associated with a city.

A name catalog may be used to identify one or more terms of the data as being associated with a classification. The name catalogs may include one or more terms that were previously entered or verified by a user as being associated with a classification. Terms in the name catalogs may be collected from multiple different users' input data. The name catalogs associated with a classification may be, for example, a list of entity names that are associated with the classification. For example, a name catalog for a city classification may include "Boston" and "New York" as entity names that are associated with the city classification. As another example, a name catalog for a restaurant classification may include "Boston Market" as an entity name that is associated with the restaurant classification. A text string may be compared to entity names in the name catalogs to find a match. Terms that have matching entity names in a name catalog may be identified as being associated with the classification corresponding to the name catalog.

Name catalogs may be used to resolve ambiguities associated with classifying the data using classification rules. For example, terms identified as being associated with two or more classifications using each classification's rules may be compared to terms in each classification's name catalogs. If terms of the data match terms in one classification's name catalog but not the other classification's name catalog, the terms of the data are more likely associated with the classification in which the matching terms were found in the corresponding name catalog.

For example, the computing system receives data that includes the text "Boston Market." Using classification rules and name catalogs for the city classification, state classification, and restaurant classification, the computing system determines that "Boston" may potentially be a city name and "Boston Market" may potentially be a restaurant name. The computing system determines that the text string "Boston" of "Boston Market" may potentially be associated with two classifications.

The computing system obtains contextual information associated with the data at 204. Contextual information may include information describing circumstances or facts related to the data or related to obtaining the data, such as location, date, and time. Examples of contextual information include a location, a date, a time, a monetary value, and a product associated with the data. The contextual information may be obtained from sources and services external to the data itself. Examples of contextual information may include an analogue record that is digitized, data associated with a user of the computing system, data associated with a sensor in a computing system, and data extracted from data stored in a computing system. For example, contextual information may be obtained from a global positioning system (GPS) sensor, a location service, an image of a receipt, a user's calendar application, a user's email messages, or updates to a user's social media web page. The computing system may process the contextual information using classification rules and name catalogs. The computing system may compare the contextual information with the data and compare classifications of the contextual information with classifications of the data to determine which classification is more likely associated with the data. For example, data may be more likely associated with one classification than other classifications when the data matches the contextual information and the contextual information is associated with that one classification.

For example, a user may associate an image of a receipt with the data. The computing system may obtain contextual information from the image of the receipt. To obtain contextual information, the computing system may perform optical character recognition (OCR) on the image of the receipt to identify text in the image. The computing system may perform text analysis and parts-of-speech tagging on the text of the image so that the text of the image may be processed to obtain contextual information. The computing system may process the contextual information from the image using classification rules and name catalogs. The computing system may obtain information from the image such as company name, location, financial value, date, and time. The computing system may compare the contextual information with the data and compare classifications of the contextual information with classifications of the data to resolve ambiguities.

As another example, the computing device may obtain contextual information specifying a user's location when receiving data to be classified. The computing system may determine geographic coordinates specifying the user's geographic location from a GPS transceiver or from cellular triangulation data. The computing system may use the geographic coordinates to obtain location information from a location service. The location information may be, for example, a name of a city, state, country, or business at the geographic location specified by the geographic coordinates. The location information may include classifications associated with the locations specified by the location information. The location information may be used to determine other contextual information such as the currency being used or the rate of exchange. The computing system may compare the contextual information with the data and compare classifications of the contextual information with classifications of the data to resolve ambiguities.

As yet another example, the computing system may obtain information from the user's contacts database, calendars, events lists, or tasks lists. Information from the user's contacts database may include, for example, names, phone numbers, addresses, and emails of the user's contacts. Information from the user's calendar, events lists, and tasks lists may include, for example, event locations, phone numbers, addresses, and attendees. The information may specify classifications associated with each item of information. The computing system may compare the contextual information with the data and compare classifications of the contextual information with classifications of the data to resolve ambiguities.

The computing system obtains historical information associated with a user of the computing system at 206. Historical information may include information relating to a user's word usage, preferences, or past interactions. The computing system may process the historical information using classification rules and name catalogs. The computing system may compare the historical information with the data and compare classifications of the historical information with classifications of the data to determine which classification is more likely associated with the data. For example, data may be more likely associated with a classification when the data matches the historical information and the historical information is associated with the classification.

Historical information may include information associated with the user's language use history. The user's language use history includes terms that were previously entered or verified by the user as being associated with a classification. The computing system may compare the data with terms from the user's language use history and compare classifications of the data with classifications of the terms to resolve ambiguities.

Historical information may include information associated with the user's social media history and preferences from social media sites and other websites with which the user interacts. The user's social media history and preferences may include information associated with people and places. These associations may be used to derive proper nouns of people, places, and things. The computing system may compare the data with information associated with the user's social media history and preferences and compare classifications of the data with classifications of the information to resolve ambiguities.

The computing system may obtain contextual or historical information from external systems and services as alternatives or in addition to systems and services described above. For example, the computing system may obtain information from various applications running on the computing device. As another example, the computing system may obtain information from cloud-based services such as cloud-based computing and storage services. The computing system may use such information to resolve ambiguities associated with classifying the data.

When using more than one type of information to resolve ambiguities, each item of information may be associated with an accuracy modifier based on the type of information. For example, language use history matches could be considered 1.2 times more likely to be correct than social media history matches. In some implementations, the accuracy modifiers for each type of information may be set by an application developer as an application configuration. In some implementations, the accuracy modifiers for each type of information may be set based on the history of resolving ambiguities using that type of information. For example, if the history for resolving ambiguities using social media history shows that ambiguities are correctly resolved 50% of the time and the history for resolving ambiguities using language use history shows that ambiguities are resolved 75% of the time, the accuracy modifier for social media history will be lower than the accuracy modifier for language use history. In some embodiments, the accuracy modifier is a positive value. In some embodiments, the accuracy modifier is less than one and in other embodiments it is greater than one.

The computing system determines that data is more likely associated with one classification than other classifications based on the contextual information and/or the historical information at 208. The computing system may determine a score for each potential classification of the data. The scores may be computed based on matches between the data and the contextual or historical information and based on the accuracy modifiers for the contextual and historical information. Each score may represent the probability that the classification associated with the score is the correct classification of the data. In some embodiments, the score is positive value. In some embodiments, the score is proportional to a measure of confidence that the data is associated with a meaning or classification.

For example, the computing system may use an image of a receipt, location information, language use history, and social media history to determine that the data "Boston Market" is more likely associated with the restaurant classification than the city classification. Based on matching the terms "Boston Market" of the data to text identifying a business name of "Boston Market" on an image of receipt, the computing system calculates a weighted score of 111.6 for the image information associating the data with the restaurant classification. In some embodiments, a weighted score is proportional to the product of a score and a weight. The weight is associated with the contextual information and the historical information. In some embodiments, the weight is the accuracy modifier. In some embodiments, the product is modified by a multiplier, an offset, and may be rounded, and the like. Based on matching the terms "Boston Market" of the data to a business location at the user's geographic location, the computing system calculates a weighted score of 49.5 for the location information associating the data with the restaurant classification. Based on matching the term "Boston" of the data to a term that the user previously verified as associated with the city classification, the computing system calculates a weighted score of 50 for the language use history information associating the data with the city classification. Based on matching the terms "Boston Market" of the data to business locations identified as previously visited by the user in the user's social media history, the computing system calculates a weighted score of 53.6 for the social media history information associating the data with the restaurant classification. In some embodiments, the scores, accuracy modifier, and weighted score for each meaning or classification is represented as slices of a three dimensional matrix. Each slice corresponds to a meaning. Examples are shown in Table 1 and Table 2 below. The computing system determines that the restaurant classification has a total score of 357.7 and the city classification has a total score of 161.5. In some embodiments, based on the total scores for each potential classification of the data, the computing system determines that the data "Boston Market" is more likely associated with the restaurant classification than the city classification. In some embodiments, based upon the maximum weighted score the word-sense and/or classification is determined. In some embodiments, where classification is not the intended result of the process 200, the word sense is determined and recorded instead of the classification.

TABLE 1

"Boston Market" as Business Name

| Source | Score | Accuracy Modifier | Weighted Score |
|---|---|---|---|
| Image | 93 | 1.2 | 111.6 |
| Location Information | 95 | 1.5 | 142.5 |
| Language Use History | 25 | 2 | 50 |
| Social Media | 67 | 0.8 | 53.6 |

TABLE 2

"Boston Market" as Location

| Source | Score | Accuracy Modifier | Weighted Score |
|---|---|---|---|
| Image | 45 | 1.2 | 54 |
| Location Information | 33 | 1.5 | 49.5 |
| Language Use History | 25 | 2 | 50 |
| Social Media | 10 | 0.8 | 8 |

The computing system may request verification from the user that the data was correctly classified at 208. In some embodiments, the word-sense disambiguation result or classification result can be presented for review by a user. The computing system may display the classification to the user and request verification from the user that the displayed classification is the correct classification of the data. Where the user accepts or rejects the classification, or more generally, the word-sense disambiguation, the user's feedback can be used to update the system. For example, the computing system may use correctly classified data and a corresponding classification to improve and expand the classification rules and name catalogs. As another example, the accuracy modifier (or weight) can be updated. Alternatively, or additionally, the system that creates the unmodified score can be updated. For example, if the system is a separate machine learning system. In some embodiments, the verification occurs prior to a record being added to a data source, for example, before a classification of an expense report item is added to an expense report.

Figure 3:
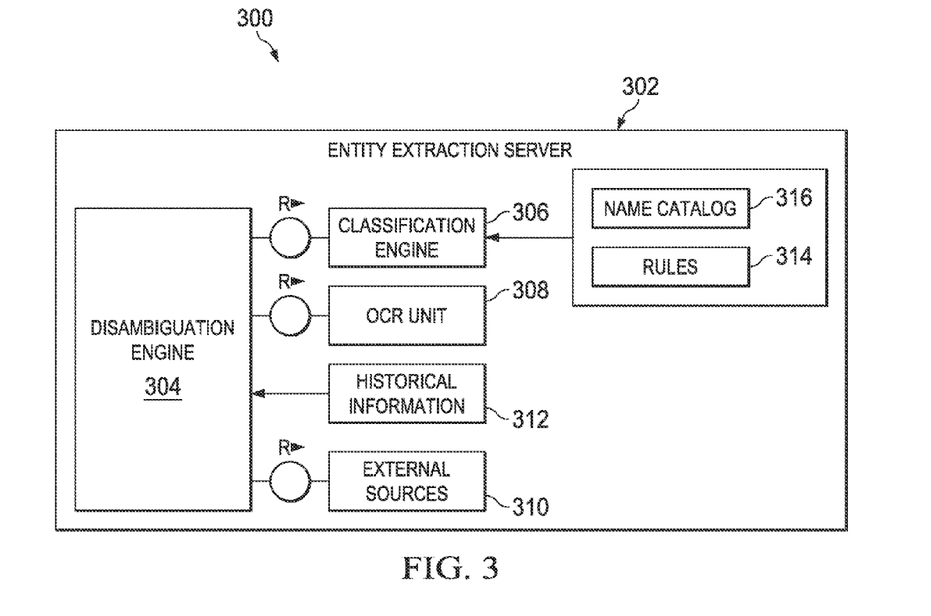
FIG. 3 shows a block diagram of an example of a system operable to disambiguate data using contextual and historical information.

FIG. 3 shows a block diagram of an example of a system 300 operable to disambiguate and/or classify data. In FIG. 3, the technique of classification is described. Alternatively or additionally, the system 300 of FIG. 3 may be used for word-sense disambiguation. The system 300 includes an entity extraction server 302. The entity extraction server 302 includes a disambiguation engine 304 that communicates with a classification engine 306, an OCR unit 308, and external sources 310.

The classification engine 306 may perform text analysis and parts-of-speech tagging on the text of the data. The classification engine 306 may classify the data based on, for example, classification rules 314 and name catalogs 316. The classification engine 306 may determine that data is potentially associated with two or more classifications of a given number of classifications. The classification engine 306 may send the classification results to the disambiguation engine 304. The disambiguation engine 304 may send correctly classified data and a corresponding classification to the classification engine 306. The classification engine 306 may use the correctly classified data and the corresponding classification to improve and expand the classification rules 314 and the name catalogs 316.

The disambiguation engine 304 may receive contextual information from the OCR unit 308 or external sources 310. The OCR unit 308 may receive an image and perform OCR on the image to identify text in the image. The OCR unit 308 may send the text of the image to the disambiguation engine 304 to process the contextual information from the image. The disambiguation engine 304 may use the contextual information from the image to resolve ambiguities associated with the classification of the data. External sources 310 may include a GPS transceiver, a cellular transceiver, applications running on a user's computing device, and cloud-based services such as cloud-based computing and storage services.

The disambiguation engine 304 may receive historical information 312 from a storage device. The historical information 312 may be stored on a storage device in the user's computing device or on a storage device of a server.

A number of implementations have been described. Nevertheless, it will be understood that various modifications may be made. For example, other methods described herein besides or in addition to that illustrated in FIG. 2 may be performed. Further, the illustrated steps of process 200 may be performed in different orders, either concurrently or serially. Further, steps may be performed in addition to those illustrated in process 200, and some steps illustrated in process 200 may be omitted without deviating from the present disclosure. Accordingly, other implementations are within the scope of the following claims.

What is claimed is:

1. A method performed with a computing system for disambiguating data, the method comprising:
   determining that data is potentially associated with two or more classifications of a plurality of classifications;
   obtaining contextual information associated with the data;
   obtaining historical information for a user associated with the data;
   determining at least one accuracy modifier associated with an information type of the contextual information and the historical information, the at least one accuracy modifier indicating an accuracy of at least one previous use of the information type to resolve a data classification ambiguity;
   employing the at least one accuracy modifier as at least one weight for the contextual information and the historical information;
   determining at least one weighted score based on the at least one accuracy modifier; and
   determining that the data is more likely associated with one classification of the two or more classifications than other classifications of the two or more classifications, the determining based at least partly on a maximum of the at least one weighted score.

2. The method of claim 1, wherein determining that data is potentially associated with two or more classifications of a plurality of classifications comprises:
   determining that the data is potentially associated with a first classification of the two or more classifications based on one or more rules associated with the first classification; and
   determining that the data is potentially associated with a second classification of the two or more classifications based on one or more rules associated with the second classification.

3. The method of claim 1, wherein:
   obtaining contextual information associated with the data comprises:
      obtaining an image containing text,
      performing optical character recognition on the image to identify the text, and
      identifying one or more terms of the text as describing at least one of a location, a date, a time, a monetary value, a product, or a service associated with the data; and
   determining that the data is more likely associated with one classification than other classifications comprises determining that the one or more terms of the text is associated with the one classification.

4. The method of claim 1, wherein:
   obtaining contextual information associated with the data comprises:
      determining geographical coordinates of a computing device, and
      obtaining information identifying a location associated with the data based on the geographical coordinates; and
   determining that the data is more likely associated with one classification than other classifications comprises determining that the location is associated with the one classification.

5. The method of claim 1, wherein:
   obtaining historical information associated with the user of the computing system comprises, for each classification of the two or more classifications, obtaining a set of one or more terms previously identified by the user as being associated with the classification; and
   determining that the data is more likely associated with one classification than other classifications comprises determining that one or more terms of the data is included in a set of one or more terms previously identified by the user as being associated with the one classification.

6. The method of claim 1, wherein:
   obtaining historical information associated with the user of the computing system comprises obtaining information identifying at least one of people, places, or things that the user has interacted with in the past; and
   determining that the data is more likely associated with the one classification than other classifications comprises determining that the information identifying at least one of people, places, or things that the user has interacted with in the past is associated with the one classification.

7. A non-transitory computer readable storage medium encoded with a computer program, the program comprising instructions that when executed by one or more computers cause the one or more computers to perform operations comprising:
   determining that data is potentially associated with two or more classifications of a plurality of classifications;
   obtaining contextual information associated with the data;
   obtaining historical information associated with a user;
   determining at least one accuracy modifier associated with an information type of the contextual information and the historical information, the at least one accuracy modifier indicating an accuracy of at least one previous use of the information type to resolve a data classification ambiguity;
   employing the at least one accuracy modifier as at least one weight for the contextual information and the historical information;
   determining at least one weighted score based on the at least one accuracy modifier; and
   determining that the data is more likely associated with one classification of the two or more classifications than other classifications of the two or more classifications, the determining based at least partly on a maximum of the at least one weighted score.

8. The non-transitory computer readable storage medium of claim 7, wherein determining that data is potentially associated with two or more classifications of a plurality of classifications comprises:
   determining that the data is potentially associated with a first classification of the two or more classifications based on one or more rules associated with the first classification; and
   determining that the data is potentially associated with a second classification of the two or more classifications based on one or more rules associated with the second classification.

9. The non-transitory computer readable storage medium of claim 7, wherein:
   obtaining contextual information associated with the data comprises:
      obtaining an image containing text,
      performing optical character recognition on the image to identify the text, and
      identifying one or more terms of the text as describing at least one of a location, a date, a time, a monetary value, a product, or a service associated with the data; and
   determining that the data is more likely associated with one classification than other classifications comprises determining that the one or more terms of the text is associated with the one classification.

10. The non-transitory computer readable storage medium of claim 7, wherein:
   obtaining contextual information associated with the data comprises:
      determining geographical coordinates of a computing device, and
      obtaining information identifying a location associated with the data based on the geographical coordinates; and
   determining that the data is more likely associated with one classification than other classifications comprises determining that the location is associated with the one classification.

11. The non-transitory computer readable storage medium of claim 7, wherein:
   obtaining historical information associated with the user comprises, for each classification of the two or more classifications, obtaining a set of one or more terms previously identified by the user as being associated with the classification; and
   determining that the data is more likely associated with one classification than other classifications comprises determining that one or more terms of the data is included in a set of one or more terms previously identified by the user as being associated with the one classification.

12. The non-transitory computer readable storage medium of claim 7, wherein:
   obtaining historical information associated with the user comprises obtaining information identifying at least one of people, places, or things that the user has interacted with in the past; and
   determining that the data is more likely associated with the one classification than other classifications comprises determining that the information identifying at least one of people, places, or things that the user has interacted with in the past is associated with the one classification.

13. A system of one or more computers configured to perform operations comprising:
   determining that data is potentially associated with two or more classifications of a plurality of classifications;
   obtaining contextual information associated with the data;
   obtaining historical information associated with a user;
   determining at least one accuracy modifier associated with an information type of the contextual information and the historical information, the at least one accuracy modifier indicating an accuracy of at least one previous use of the information type to resolve a data classification ambiguity;
   employing the at least one accuracy modifier as at least one weight for the contextual information and the historical information;
   determining at least one weighted score based on the at least one accuracy modifier; and
   determining that the data is more likely associated with one classification of the two or more classifications than other classifications of the two or more classifications, the determining based at least partly on a maximum of the at least one weighted score.

14. The system of claim 13, wherein determining that data is potentially associated with two or more classifications of a plurality of classifications comprises:
   determining that the data is potentially associated with a first classification of the two or more classifications based on one or more rules associated with the first classification; and
   determining that the data is potentially associated with a second classification of the two or more classifications based on one or more rules associated with the second classification.

15. The system of claim 13, wherein:
obtaining contextual information associated with the data comprises:
   obtaining an image containing text,
   performing optical character recognition on the image to identify the text, and
   identifying one or more terms of the text as describing at least one of a location, a date, a time, a monetary value, a product, or a service associated with the data; and
determining that the data is more likely associated with one classification than other classifications comprises determining that the one or more terms of the text is associated with the one classification.

16. The system of claim 13, wherein:
obtaining contextual information associated with the data comprises:
   determining geographical coordinates of a computing device, and
   obtaining information identifying a location associated with the data based on the geographical coordinates; and
determining that the data is more likely associated with one classification than other classifications comprises determining that the location is associated with the one classification.

17. The system of claim 13, wherein:
obtaining historical information associated with the user comprises, for each classification of the two or more classifications, obtaining a set of one or more terms previously identified by the user as being associated with the classification; and
determining that the data is more likely associated with one classification than other classifications comprises determining that one or more terms of the data is included in a set of one or more terms previously identified by the user as being associated with the one classification.

18. The system of claim 13, wherein:
obtaining historical information associated with the user comprises obtaining information identifying at least one of people, places, or things that the user has interacted with in the past; and
determining that the data is more likely associated with the one classification than other classifications comprises determining that the information identifying at least one of people, places, or things that the user has interacted with in the past is associated with the one classification.

* * * * *